United States Patent
Ijima et al.

(10) Patent No.: US 9,950,578 B2
(45) Date of Patent: Apr. 24, 2018

(54) TIRE AIR PRESSURE DETECTION DEVICE

(71) Applicant: DENSO CORPORATION, Kariya, Aichi-pref. (JP)

(72) Inventors: Ryoichi Ijima, Kariya (JP); Takatoshi Sekizawa, Kariya (JP); Masashi Mori, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/308,015

(22) PCT Filed: Apr. 24, 2015

(86) PCT No.: PCT/JP2015/002251
§ 371 (c)(1),
(2) Date: Oct. 31, 2016

(87) PCT Pub. No.: WO2015/174031
PCT Pub. Date: Nov. 19, 2015

(65) Prior Publication Data
US 2017/0050478 A1    Feb. 23, 2017

(30) Foreign Application Priority Data
May 14, 2014 (JP) .................. 2014-100692

(51) Int. Cl.
*B60C 23/00* (2006.01)
*B60C 23/04* (2006.01)
*G01L 17/00* (2006.01)

(52) U.S. Cl.
CPC .......... *B60C 23/0474* (2013.01); *B60C 23/04* (2013.01); *B60C 23/0433* (2013.01); *B60C 23/0488* (2013.01); *G01L 17/00* (2013.01)

(58) Field of Classification Search
None
See application file for complete search history.

(56) References Cited

U.S. PATENT DOCUMENTS

2013/0207796 A1  8/2013  Stewart et al.
2016/0031273 A1  2/2016  Suzuki et al.

FOREIGN PATENT DOCUMENTS

| JP | 2012210912 A | 11/2012 |
| WO | WO-2014141690 A1 | 9/2014 |
| WO | WO-2015141152 A1 | 9/2015 |
| WO | WO-2015141199 A1 | 9/2015 |
| WO | WO-2015141200 A1 | 9/2015 |
| WO | WO-2015141201 A1 | 9/2015 |

*Primary Examiner* — James M McPherson
(74) *Attorney, Agent, or Firm* — Harness, Dickey & Pierce, P.L.C.

(57) ABSTRACT

A tire air pressure detection device has transmitters each detecting a running state of a vehicle on the basis of a detection signal of an acceleration sensor and transmitting a frame when it is determined that the vehicle is running. Because acceleration varies independently of a tire rotation speed, a frame can be transmitted even before a vehicle speed reaches or exceeds, for example, 30 km/h. Consequently, data on a tire air pressure can be transmitted in a short time period from a running start of the vehicle and hence a decrease in tire air pressure can be detected in a short time period from the running start of the vehicle.

3 Claims, 3 Drawing Sheets

TIRE AIR PRESSURE DETECTION DEVICE

CROSS REFERENCE TO RELATED APPLICATIONS

This application is a U.S. National Phase Application under 35 U.S.C. 371 of International Application No. PCT/JP2015/002251 filed on Apr. 24, 2015 and published in Japanese as WO 2015/174031 A1 on Nov. 19, 2015. This application is based on and claims the benefit of priority from Japanese Patent Application No. 2014-100692 filed on May 14, 2014. The entire disclosures of all of the above applications are incorporated herein by reference.

TECHNICAL FIELD

The present disclosure relates to a tire air pressure detection device detecting a tire air pressure.

BACKGROUND ART

A tire air pressure detection device in the related art described in Patent Document 1 includes a transmitter which is provided with a pressure sensor and attached to an air injection valve in a wheel rim of each wheel, and detects a tire air pressure by transmitting data on a tire air pressure from the transmitter to a receiver on a vehicle body side. In the tire air pressure detection device as above, the transmitter is installed inside a tire and power cannot be supplied to the transmitter from an in-vehicle battery. Accordingly, a battery is equipped to the transmitter and the transmitter detects a tire air pressure and transmits data on power supplied from the battery.

As has been described, because the tire air pressure detection device in the related art drives the transmitter on power supplied from the battery, a reduction of power consumption is an issue to be addressed. In an effort to reduce power consumption, data is transmitted from the transmitter after a vehicle starts running, and whether the vehicle starts running is detected depending on whether a measured value of an acceleration sensor is large or small. It is, however, difficult to accurately detect that the vehicle starts running unless a vehicle speed reaches or exceeds a certain speed (for example, 30 km/h) after a running start of the vehicle because of accuracy of the acceleration sensor, and it takes a time to output tire air pressure information in some cases. That is to say, in a case where the transmitter is provided to the air injection valve in the wheel rim, only acceleration by rotation of the wheel is available to detect whether vehicle starts running and whether the vehicle starts running cannot be detected accurately unless a vehicle speed reaches a certain speed.

PRIOR ART DOCUMENT

Patent Document

Patent Document 1: JP 2012-210912 A

SUMMARY

In view of the foregoing points, it is an object of the present disclosure to provide a tire air pressure detection device capable of outputting tire air pressure information quickly.

According to an aspect of the present disclosure, a tire air pressure detection device includes transmitters provided, respectively, to wheels each having a tire, and receiver provided to a vehicle body. Each transmitter includes: a sensing portion including a pressure sensor outputting a detection signal indicating a tire air pressure of a corresponding wheel among the plurality of wheels, and an acceleration sensor being attached to a back side of a tread of the tire and outputting a detection signal indicating acceleration of the corresponding wheel in a radial direction or a rotational direction of the wheel; a first control portion processing the detection signal indicating the tire air pressure and generating a frame in which data on the tire air pressure is stored; and a radio wave transmission portion transmitting the frame. The receiver includes a radio wave reception portion receiving the transmitted frame, and a second control portion detecting a decrease in tire air pressure on a basis of the data on the tire air pressure stored in the received frame.

The first control portion determines whether a vehicle is running based on a change of the acceleration obtained from the detection signal of the acceleration sensor. The change of the acceleration is caused by a contact between an installation corresponding spot on the tread corresponding to where the acceleration sensor is installed and a road surface. The first control portion controls the radio wave transmission portion to transmit the frame when the first control portion determines that the vehicle is running.

In the manner as above, in the transmitter, a running state of the vehicle is detected on the basis of the detection signal of the acceleration sensor and the frame is transmitted when it is determined that the vehicle is running. Because the acceleration varies independently of a tire rotation speed, the frame can be transmitted even before a vehicle speed reaches or exceeds, for example, 30 km/h after a running start of the vehicle. Consequently, tire air pressure information can be notified quickly and hence a decrease in tire air pressure can be detected promptly.

DESCRIPTION OF EMBODIMENTS

Figure 1:
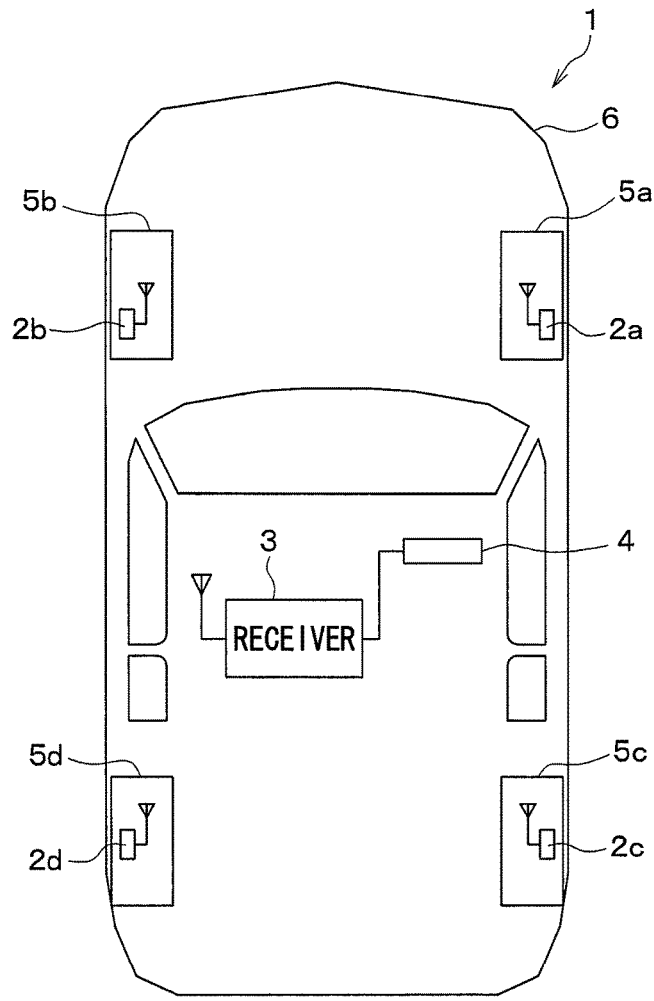
FIG. 1 is a schematic diagram showing a tire air pressure detection device according to an embodiment of the present disclosure.

One embodiment of the present disclosure will be described with reference to FIG. 1 through FIG. 6. Referring to FIG. 1, a top on a sheet surface corresponds to a front of a vehicle 1, a bottom on the sheet surface is a rear of the vehicle 1, and a right-left direction on the sheet surface corresponds to a right-left direction of the vehicle 1.

A tire air pressure detection device shown in FIG. 1 is attached to the vehicle 1 and includes transmitters 2a, 2b, 2c, and 2d, a receiver 3, and an indicator 4.

As is shown in FIG. 1, the transmitters 2a, 2b, 2c, and 2d are attached, respectively, to wheels 5a, 5b, 5c, and 5d of the vehicle 1. The transmitters 2a through 2d detect air pressures of tires attached to the corresponding wheels 5a through 5d and transmit data on detection signals indicating detection results by storing the data in frames. The receiver 3 is attached to a vehicle body 6 of the vehicle 1, and receives the frames transmitted from the transmitters 2a through 2d and detects a tire air pressure by performing various types of processing and computations on the basis of the detection signals stored in the frames. That is to say, the tire air pressure detection device of the present disclosure is a direct tire air pressure detection device which detects a tire air pressure by transmitting detection results from the transmitters 2a through 2d attached to the wheels 5a through 5d, respectively, to the receiver 3 attached to the vehicle body 6.

Figure 2:
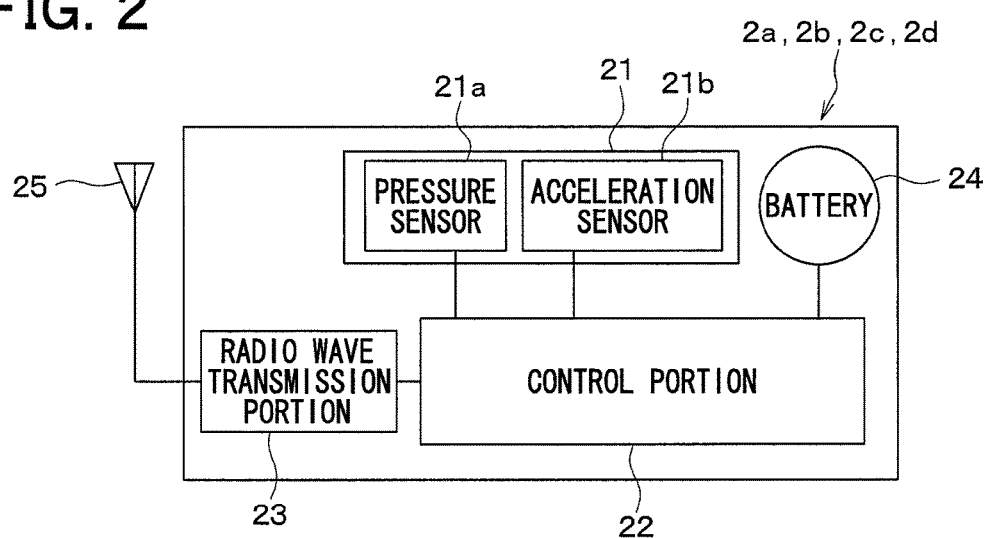
FIG. 2 is a block diagram showing a transmitter of the tire air pressure detection device of the embodiment.
Figure 4:
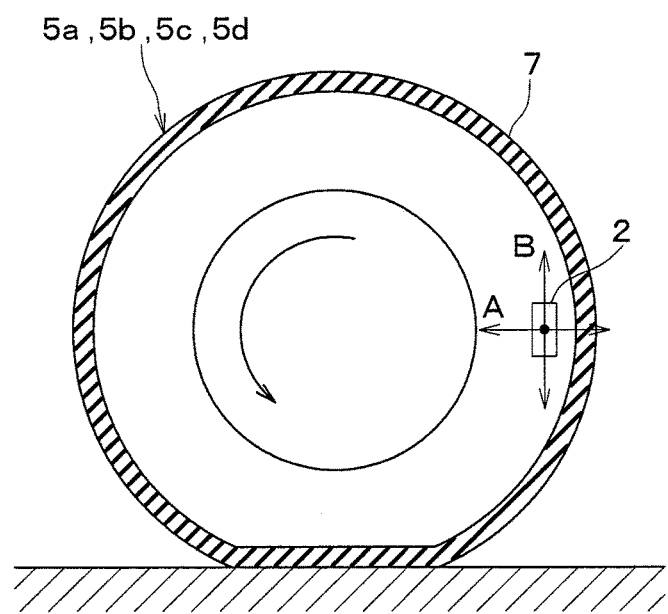
FIG. 4 is a schematic diagram showing a state in which the transmitter of the embodiment is attached to a tire.

As is shown in FIG. 2, each of the transmitters 2a through 2d includes a sensing portion 21, a control portion (first control portion) 22, a radio wave transmission portion 23, a battery 24, and an antenna 25. Each portion is driven on power supplied from the battery 24. For example, as is shown in FIG. 4, the transmitters 2a through 2d are attached to back sides of treads of tires 7 attached to the corresponding wheels 5a through 5d, and rotate with the tires 7. When the tires 7 make contact with a road surface, contact-induced vibrations are applied to the transmitters 2a through 2d.

The sensing portion 21 includes a pressure sensor 21a and an acceleration sensor 21b. The sensing portion 21 sends a detection signal corresponding to a tire air pressure outputted from the pressure sensor 21a and a detection signal corresponding to acceleration generated by tire rotation and outputted from the acceleration sensor 21b to the control portion 22. In the present embodiment, each of the transmitters 2a through 2d is attached to the back side of the tread of the tire 7. Hence, in addition to rotation acceleration of the tire 7, a detection signal of the acceleration sensor 21b sent to the control portion 22 also indicates acceleration given when the tire 7 makes contact with a road surface.

The control portion 22 includes a known microcomputer having a CPU, a ROM, a RAM, an I/O, and so on, and performs predetermined processing according to a program pre-stored in a memory, such as the ROM. ID information including transmitter-specific identification information to identify the own transmitter 2a, 2b, 2c, or 2d and vehicle-specific identification information to identify the own vehicle is stored in an internal memory of the control portion 22.

The control portion 22 receives a detection signal outputted from the pressure sensor 21a and applies signal processing to the received detection signal and processes the received detection signal when necessary. The control portion 22 stores the resulting signal into a frame as data indicating a detection result with the ID information of the own transmitter 2a, 2b, 2c, or 2d, and sends the frame to the radio wave transmission portion 23. To be more specific, the control portion 22 detects a tire air pressure on the basis of a detection signal of the pressure sensor 21a and stores data indicating the tire air pressure in a frame with the ID information.

The sensing portion 21 may additionally include a temperature sensor. In such a case, data indicating a tire internal temperature detected by the temperature sensor can be stored into a frame. Alternatively, a tire air pressure may be converted to a tire air pressure at a predetermined reference temperature on the basis of the detected tire internal temperature to store data indicating the converted tire air pressure into a frame. Further, it may be configured in such a manner that the control portion 22 itself determines a decrease in tire air pressure to store data indicating whether a tire air pressure has decreased into a frame and sends the frame to the radio wave transmission portion 23. For example, the control portion 22 may compare the converted tire air pressure at the predetermined reference temperature with a predetermined warning threshold Th to store data indicating that a tire air pressure has decreased into a frame when the control portion 22 detects that the converted tire air pressure decreases to or below the warning threshold Th.

In the following description, data indicating a detection result of a tire air pressure or the like and data indicating whether or not a tire air pressure has decreased are referred to as data on a tire air pressure. It should be appreciated, however, that all types of data are not necessarily included in the data on a tire air pressure and the data on a tire air pressure may include either data indicating a tire air pressure or the like or data indicating whether or not a tire air pressure has decreased.

Also, the control portion 22 determines a running state of the vehicle, that is, whether the vehicle is running or stopped, on the basis of a detection signal of the acceleration sensor 21b and transmits a frame in which the data on a tire air pressure is stored at frame transmission timing, that is, when the control portion 22 determines that the vehicle is running.

As has been described, each of the transmitters 2a through 2d is attached to, for example, the back side of the tread of the tire 7 to enable the acceleration sensor 21b to detect acceleration of the tire 7 in a radial direction (arrow A of FIG. 4) or a rotational direction (arrow B of FIG. 4). Hence, a vibration generated when a spot on the tread of the tire 7 corresponding to where the transmitter 2a, 2b, 2c or 2d is installed (hereinafter, referred to as the installation corresponding spot) makes contact with a road surface during tire rotation is applied to the acceleration sensor 21b. Because the tire 7 deforms in the radial direction when the installation corresponding spot makes contact with a road surface, acceleration of the tire 7 in the radial direction varies. Also, because the tire 7 shifts from a non-ground contacting state to a ground contacting state when the installation corresponding spot makes contact with a road surface, stress varies due to friction between the road surface and the tire 7 and acceleration of the tire 7 in the rotational direction varies, too. Accordingly, by monitoring a change of acceleration of the tire 7 in either the radial direction or the rotational direction, whether the installation corresponding spot makes contact with a road surface or leaves the road surface can be determined and hence whether the vehicle is running or stopped can be determined.

Figure 5:
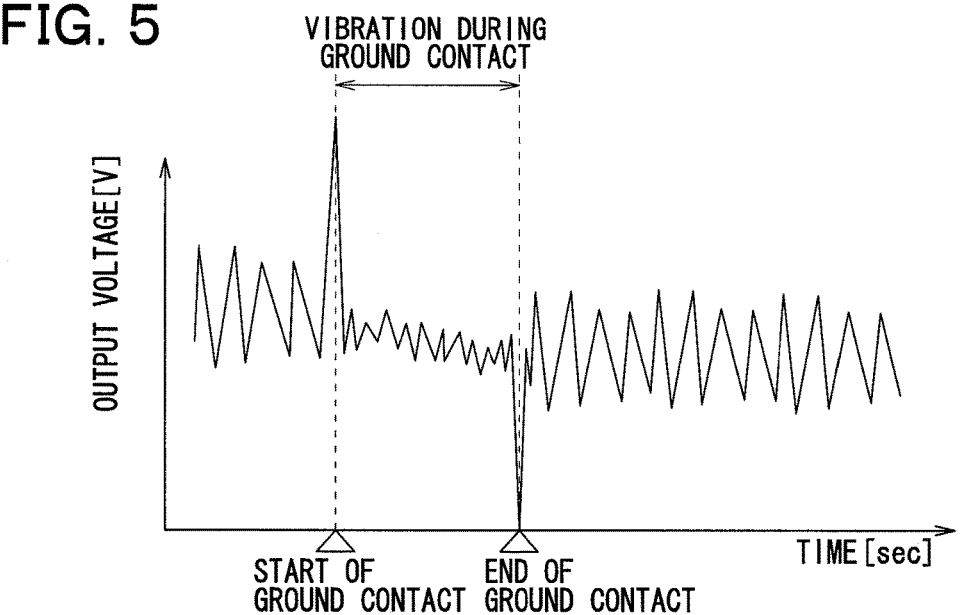
FIG. 5 is a diagram showing a fluctuation of a detection signal of an acceleration sensor of the embodiment.

For example, a detection signal of the acceleration sensor 21b during tire rotation fluctuates as is shown in FIG. 5. That is, acceleration increases instantaneously when the installation corresponding spot makes contact with a road surface and decreases instantaneously when the installation corresponding spot leaves the road surface. Hence, the control portion 22 determines that the vehicle is running, for example, when acceleration instantaneously takes a maximum value or a minimum value or when acceleration takes both of a maximum value and a minimum value within a predetermined time. The control portion 22 transmits a frame when the control portion determines that the vehicle is running. Acceleration varies as above independently of a tire rotation speed. Hence, a frame can be transmitted even before a vehicle speed reaches or exceeds, for example, 30 km/h after a running start of the vehicle. Consequently, tire air pressure information can be notified quickly.

The radio wave transmission portion 23 functions as an output portion which transmits a frame sent from the control portion 22 to the receiver 3 in a form of RF waves via the antenna 25. It is set in such a manner that the control portion 22 sends a signal to the radio wave transmission portion 23 at each predetermined transmission timing according to the program. To be more specific, each of the transmitters 2a through 2d starts to transmit a frame in which data on a tire air pressure is stored at transmission start timing, that is, when it is determined that the vehicle is running. The radio wave transmission portion 23 continues to transmit frames while the vehicle is running and transmission of frames is continued until the vehicle is stopped. Frames are transmitted at arbitrary intervals. It is, however, preferable to transmit a frame, for example, each time the number of tire rotations reaches a predetermined number of rotations or to transmit a frame in predetermined regular transmission cycles when consideration is given to a battery life. In a case where the control portion 22 is configured to detect a decrease in tire air pressure, frame transmission intervals may be varied with a tire air pressure. For example, when a tire air pressure has decreased, frames may be transmitted at shorter frame transmission intervals than frame transmission intervals before the tire air pressure has decreased.

The battery 24 supplies power to the sensing portion 21 and the control portion 22. The sensing portion 21 acquires data on a tire air pressure and the control portion 22 performs various computations on power supplied from the battery 24.

Each of the transmitters 2a through 2d is configured in the manner as described above. Each of the transmitters 2a through 2d detects a tire air pressure of the corresponding wheel and transmits a frame at each predetermined transmission timing via the antenna 25 provided to each of the transmitters 2a through 2d.

Figure 3:
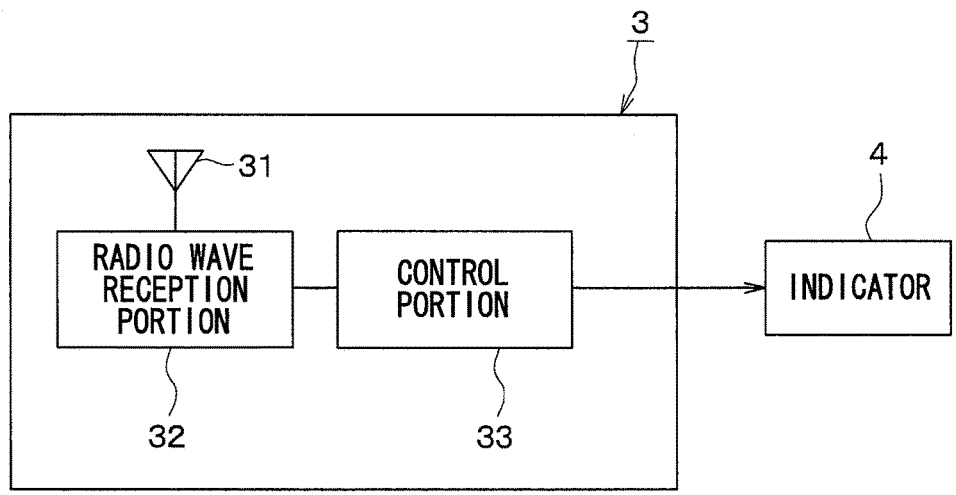
FIG. 3 is a block diagram showing a receiver of the tire air pressure detection device of the embodiment.

As is shown in FIG. 3, the receiver 3 includes an antenna 31, a radio wave reception portion 32, and a control portion 33.

The antenna 31 receives frames transmitted from the respective transmitters 2a through 2d. In the present embodiment, the antenna 31 is a single common antenna which collectively receives frames transmitted from the respective transmitters 2a through 2d and fixed to the vehicle body 6.

The radio wave reception portion 32 functions as an input portion which inputs frames transmitted from the respective transmitters 2a through 2d and received at the antenna 31 into the control portion 33 by transferring the received frames.

The control portion (second control portion) 33 includes a known microcomputer having a CPU, a ROM, a RAM, an I/O, and so on and performs various types of processing relating to a tire air pressure detection according to a program pre-stored in the ROM or the like. The control portion 33 operates on power supplied from an unillustrated battery and controls the radio wave reception portion 32 to receive frames while performing various types of processing relating to a tire air pressure detection by the control portion 33 itself.

For example, the control portion 33 finds a tire air pressure by performing various types of signal processing and computations on the basis of data on a tire air pressure stored in frames received from the radio wave reception portion 32 as various types of processing relating to a tire air pressure detection. The control portion 33 outputs an electrical signal corresponding to the found tire air pressure to the indicator 4. For example, the control portion 33 compares the found tire air pressure with the predetermined warning threshold Th. When the control portion 33 detects that the tire air pressure has decreased to or below the predetermined warning threshold Th, the control portion 33 outputs a signal indicating a detection result to the indicator 4. In a case where each of the transmitters 2a through 2d is configured to detect a tire air pressure, the control portion 33 is capable of notifying the indicator 4 that a tire air pressure has decreased on the basis of data included in a received frame and indicating that a tire air pressure has decreased.

Further, the control portion 33 is capable of finding tire air pressures of the respective four wheels 5a through 5d and outputting the found tire air pressures correlated with the respective wheels 5a through 5d to the indicator 4. ID information of the transmitters 2a through 2d installed, respectively, to the wheels 5a through 5d correlated with locations of the respective wheels 5a through 5d is pre-stored in a memory of the control portion 33. Hence, by checking the ID information stored in the frame against the ID information stored in the own memory, the control portion 33 is capable of finding out a transmitter of the received frame among the transmitters 2a through 2d attached to the wheels 5a through 5d, respectively, and identifying in which one of the wheels a tire air pressure has decreased. Accordingly, when a tire air pressure has decreased, the control portion 33 identifies in which one of the wheels a tire air pressure has decreased and outputs the identified wheel to the indicator 4. Alternatively, even when a tire air pressure has not decreased, the control portion 33 may output the found tire air pressures correlated with the respective wheels 5a through 5d to the indicator 4.

In the manner as above, a decrease in tire air pressure in any one of the four wheels 5a through 5d or tire air pressures of the respective four wheels 5a through 5d are notified to the indicator 4.

As is shown in FIG. 1, the indicator 4 is installed at a place visually recognizable by a driver, and examples of the indicator 4 include an alarm lamp and a display provided within an instrument panel of the vehicle 1. For example, when a signal indicating that a tire air pressure has decreased is transmitted from the controller 33 of the receiver 3, the indicator 4 informs the driver of a decrease in tire air pressure by displaying a content of the received signal. Alternatively, when tire air pressures of the respective four wheels 5a through 5d are transmitted from the receiver 3, the indicator 4 displays the respective tire air pressures correlated with the respective wheels 5a through 5d.

The tire air pressure detection device of the present embodiment is configured as described above. An operation of the tire air pressure detection device of the present embodiment will now be described. Chiefly, processing performed by the transmitters 2a through 2d will be described.

Figure 6:
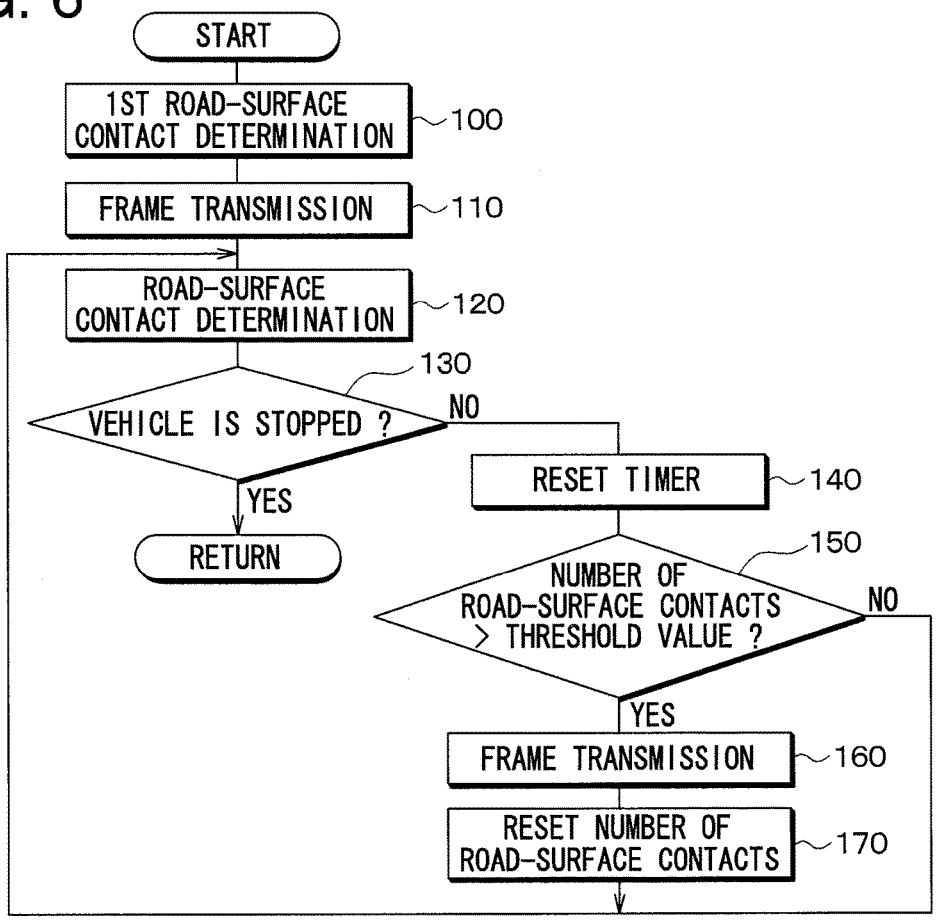
FIG. 6 is a flowchart depicting frame transmission processing performed by a control portion of the transmitter of the embodiment.

FIG. 6 shows a flowchart depicting frame transmission processing performed by the control portions 22 of the respective transmitters 2a through 2d in detail. An example of an operation of the respective transmitters 2a through 2d will be described with reference to FIG. 6.

Processing in Step 100 and processing in Step 110 are performed first as an initial transmission phase. More specifically, as is shown in Step 100, acceleration is detected on the basis of a detection signal of the acceleration sensor 21b provided to the sensing portion 21 in predetermined sensing cycles, and first road-surface contact is determined on the basis of a detection result. As has been described, a detection signal of the acceleration sensor 21b fluctuates as shown in FIG. 5. That is, acceleration increases instantaneously when the installation corresponding spot makes contact with a road surface and acceleration decreases instantaneously when the installation corresponding spot leaves the road surface. Hence, the control portion 22 determines that the vehicle is running, for example, when acceleration instantaneously takes a maximum value or a minimum value or when acceleration takes both of a maximum value and a minimum value within a predetermined time.

When the determination is made in Step 100, advancement is made to Step 110, in which a tire air pressure is detected on the basis of a detection signal of the pressure sensor 21a. That is to say, when the control portion 22 determines that the vehicle is running, the control portion 22 controls the pressure sensor 21a to detect a tire air pressure. After the detected tire air pressure is converted to a pressure at the reference temperature on the basis of a tire internal temperature detected by the temperature sensor as needed, data on a tire air pressure together with own ID information is stored into a frame and the frame is transmitted.

In the manner as above, a first frame is transmitted after the vehicle starts running according to a detection result of the acceleration sensor 21b. Acceleration varies as above independently of a tire rotation speed. Hence, a frame can be transmitted even before a vehicle speed reaches or exceeds, for example, 30 km/h after a running start of the vehicle. Consequently, data on a tire air pressure can be transmitted quickly. In other words, data on a tire air pressure can be transmitted in a relatively short time period from a running start of the vehicle.

The operation then shifts to a periodic transmission phase and processing in Step 120 and subsequent steps are performed. Firstly in Step 120, road-surface contact is determined. A determination of road surface contact is to determine that the installation corresponding spot makes contact with a road surface. Road surface contact is determined, for example, when acceleration instantaneously takes a maximum value or a minimum vale or when acceleration takes both of a maximum value and a minimum value within a predetermined time. When the road-surface contact is determined, the number of the road-surface contacts counted after the operation is shifted to the periodic transmission phase is stored, and advancement is made to Step 130.

In Step 130, whether the vehicle is stopped is detected. To be more specific, whether no road-surface contact is made during a set period is determined. The term, "set period", referred to herein is set to a period long enough to assume that the vehicle is not running on the grounds that no road-surface contact is made. Whether the vehicle is stopped is detected in the present processing by measuring a time elapsed since the last road-surface contact was made using a timer and determining whether next road-surface contact is made before the elapsed time exceeds a predetermined time.

For example, when the running vehicle is stopped, it is not preferable to continue to transmit frames afterwards. In addition, a frame may be transmitted erroneously when a vibration is propagated to the tire 7 from another vehicle and the acceleration sensor 21b outputs a detection signal indicating the propagated vibration as acceleration. It is not preferable either to continue to transmit frames after such a noise-related determination is made that the vehicle is running. Hence, the predetermined period is set and in a case where road-surface contact is not made during the set period, it is determined that the vehicle is stopped, and transmission of frames is stopped by ending the frame transmission processing.

Meanwhile, when a determination made in Step 130 is negative, advancement is made to Step 140, in which the timer used to detect whether the vehicle is stopped is cleared. Subsequently, advancement is made to Step 150, in which whether it is periodic transmission timing is determined. Herein, whether the number of road-surface contacts exceeds a threshold is determined so that a frame is transmitted each time the number of tire rotations reaches a predetermined number of rotations.

When a determination made in Step 150 is positive, advancement is made to Step 160, in which a tire air pressure is detected on the basis of a detection signal of the pressure sensor 21a. After the detected tire air pressure is converted to a pressure at the reference temperature on the basis of a tire internal temperature detected by the temperature sensor as needed, data on a tire air pressure together with own ID information is stored into a frame and the frame is transmitted. Subsequently, advancement is made to Step 170, in which the number of road-surface contacts is reset to an initial value and various types of processing in the periodic transmission phase in and after Step 120 are repeated. In a case where a determination made in Step 150 is negative, various types of processing in the periodic transmission phase in and after Step 120 are repeated because it is not yet the periodic transmission timing.

As has been described, according to an operation performed by the respective transmitters 2a through 2d, a first frame is transmitted when road-surface contact is determined, and transmission of frames is continued afterward while the vehicle is running and transmission of frames is stopped when the vehicle is stopped.

Meanwhile, the receiver 3 starts to operate, for example, when an ignition switch is turned ON and power is supplied to the control portion 33 and the radio wave reception portion 32 from the battery, and receives frames. When frames are transmitted from the transmitters 2a through 2d, the receiver 3 receives the frames and detects a tire air pressure. By notifying the indicator 4 of a detection result of a tire air pressure, the indicator 4 displays a tire air pressure at the present moment or a message or the like indicating that a tire air pressure has decreased. The driver is thus informed of a situation of a tire air pressure.

As has been described, according to the tire air pressure device of the present embodiment, each of the transmitters 2a through 2d detects a running state of the vehicle on the basis of a detection signal of the acceleration sensor 21b and transmits a frame when it is determined that the vehicle is running. Because acceleration varies independently of a tire rotation speed, a frame can be transmitted even before a vehicle speed reaches or exceeds, for example, 30 km/h after a running start of the vehicle. Consequently, tire air pressure information can be notified quickly and a decrease in tire air pressure can be detected promptly.

It should be appreciated that the present disclosure is not limited to the embodiment above and can be modified as needed within the scope of the present disclosure.

For example, processing in Steps 120 and 130 of FIG. 6 may be performed as follows in order to further restrict erroneous frame transmission when the vehicle is not running. That is, more than one number of times may be set as a predetermined threshold and it is determined that the vehicle is running when the number of road-surface contacts reaches the predetermined threshold within the period set in Step 130; otherwise, it is determined that the vehicle is stopped. Also, in a case where a time interval from timing to timing when road-surface contact is made in series is within a pre-set period, it may be determined in Step 130 that the vehicle is running, and when the time interval exceeds the pre-set period, it may be determined that the vehicle is stopped.

In order to restrict erroneous frame transmission when the vehicle is not running, it is configured in such a manner that the predetermined period is set and transmission of frames is stopped when road-surface contact is not made during the predetermined period. The configuration as above may be applied not only in the periodic transmission phase but also in the initial transmission phase. In such a case, however, because it is desirable to transmit data on a tire air pressure to the receiver 3 earlier in the initial transmission phase, it is preferable to stop transmission of frames by the method described above in the following periodic transmission phase.

The embodiment above has described a case where the whole transmitters 2a through 2d are installed to the back sides of the treads of the tires 7. It should be appreciated, however, that it is sufficient to install at least the acceleration sensors 21b of the respective transmitters 2a through 2d to the back sides of the treads of the tires 7.

While the disclosure has been described with reference to a preferred embodiment thereof, it is to be understood that the disclosure is not limited to the preferred embodiment and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A tire air pressure detection device, comprising:
    transmitters provided, respectively, to a plurality of wheels each having a tire, each transmitter including: a sensing portion including a pressure sensor outputting a detection signal indicating a tire air pressure of a corresponding wheel among the plurality of wheels, and an acceleration sensor being attached to a back side of a tread of the tire and outputting a detection signal indicating acceleration of the corresponding wheel in a radial direction or a rotational direction of the wheel; a first control portion processing the detection signal indicating the tire air pressure and generating a frame in which data on the tire air pressure is stored; and a radio wave transmission portion transmitting the frame; and
    a receiver provided to a vehicle body and including a radio wave reception portion receiving the transmitted frame and a second control portion detecting a decrease in tire air pressure on a basis of the data on the tire air pressure stored in the received frame, wherein:
    the first control portion determines whether a vehicle is running based on a change of the acceleration obtained from the detection signal of the acceleration sensor, the change of the acceleration being caused by a contact between an installation corresponding spot on the tread corresponding to where the acceleration sensor is installed and a road surface;
    after the first control portion determines that the vehicle is running, the first control portion determines whether the installation corresponding spot makes contact with the road surface within a pre-set period based on the change of the acceleration indicated by the detection signal of the acceleration sensor;
    when the first control portion determines that the installation corresponding spot makes contact with the road surface within the pre-set period, the first control portion performs periodic transmission of the frame each time a number of road-surface contacts exceeds a predetermined threshold, the number of road-surface contacts being the number of times the installation corresponding spot makes contact with the road surface; and
    when the first control portion determines that the installation corresponding spot does not make contact with the road surface within the pre-set period, the first control portion determines that the vehicle has been stopped and does not perform the periodic transmission of the frame.

2. The tire air pressure detection device according to claim 1, wherein:
    when the first control portion determines that the vehicle is running, the first control portion controls the pressure sensor to detect a tire air pressure, generates the frame in which the data on the tire air pressure is stored, and controls the radio wave transmission portion to transmit the frame.

3. The tire air pressure detection device according to claim 1, wherein:
    after the first control portion determines that the vehicle is running, the first control portion determines whether a time interval between two sequential timings of contact between the installation corresponding spot and the road surface is within a pre-set period based on the change of the acceleration indicated by the detection signal of the acceleration sensor;
    when the time interval is within the pre-set period, the first control portion performs periodic transmission of the frame; and
    when the time interval exceeds the pre-set period, the first control portion determines that the vehicle has been stopped and does not perform the periodic transmission of the frame.

* * * * *